(12) United States Patent
More et al.

(10) Patent No.: US 11,391,342 B1
(45) Date of Patent: Jul. 19, 2022

(54) VARIABLE INERTIA FLYWHEEL APPARATUS AND SYSTEM

(71) Applicant: Deere & Company, Moline, IL (US)

(72) Inventors: Swapnil More, Pune (IN); Vishal Gupta, Meerut (IN); Ayoub Siddiqui, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/211,382

(22) Filed: Mar. 24, 2021

(51) Int. Cl.
*F16F 15/31* (2006.01)

(52) U.S. Cl.
CPC .................................... *F16F 15/31* (2013.01)

(58) Field of Classification Search
CPC .. F16F 15/31; F16F 15/30; F16F 15/28; F16F 15/286; H02K 7/02; H02K 7/025; B60K 6/10; B60K 6/105; B60K 6/30
See application file for complete search history.

(56) References Cited

U.S. PATENT DOCUMENTS

| | | | | |
|---|---|---|---|---|
| 4,002,043 A | * | 1/1977 | Yoshida | F16F 15/124 464/63.1 |
| 4,335,627 A | * | 6/1982 | Maxwell | F16D 33/08 180/165 |
| 4,669,741 A | * | 6/1987 | Rohm | B23B 31/00 279/6 |
| 4,674,356 A | * | 6/1987 | Kilgore | F16F 15/363 301/5.22 |
| 5,197,352 A | | 3/1993 | Yuji | |
| 5,259,269 A | | 11/1993 | Swenson, Sr. | |
| 5,269,197 A | | 12/1993 | Yang | |
| 5,613,408 A | * | 3/1997 | Taylor | D06F 37/245 74/571.1 |
| 5,724,862 A | * | 3/1998 | Hannah | G01M 1/36 74/570.2 |
| 5,845,542 A | * | 12/1998 | Hannah | F16F 15/363 74/570.2 |

(Continued)

FOREIGN PATENT DOCUMENTS

| CN | 204805428 U | 11/2015 |
|---|---|---|
| FR | 2666547 A1 | 3/1992 |

*Primary Examiner* — Richard W Ridley
*Assistant Examiner* — Brian J McGovern
(74) *Attorney, Agent, or Firm* — Tucker Ellis LLP

(57) ABSTRACT

A variable inertia flywheel apparatus includes a cylindrical body member defining a longitudinal axis extending between spaced apart front and rear faces of the body member and an arc-shaped groove portion extending circumferentially relative to the longitudinal axis. The arc-shaped groove portion configured to selectively receive one or more tuning weights having a collective mass sufficient to vary an inertial property of the cylindrical body member between a first inertial property with the tuning weights selectively removed from the arc-shaped groove portion, and a second inertial property greater than the first inertial property with the tuning weights selectively received in the arc-shaped groove portion. A variable inertia flywheel system or assembly includes a tuning weight and a variable inertia flywheel apparatus including a cylindrical body member defining a circumferentially extending arc-shaped groove portion configured to selectively receive the tuning weight to vary the inertial property of the cylindrical body member.

21 Claims, 4 Drawing Sheets

(56) References Cited

U.S. PATENT DOCUMENTS

| | | | | |
|---|---|---|---|---|
| 5,860,865 | A * | 1/1999 | Smith | F16F 15/322 |
| | | | | 464/180 |
| 5,941,133 | A * | 8/1999 | Wierzba | F16F 15/363 |
| | | | | 74/570.2 |
| 7,044,022 | B2 | 5/2006 | Kim | |
| 7,955,178 | B2 * | 6/2011 | Mu | F16F 15/12373 |
| | | | | 464/68.92 |
| 9,121,466 | B2 * | 9/2015 | Tsugihashi | F16F 7/015 |
| 9,206,879 | B2 | 12/2015 | Yamamoto | |
| 10,487,913 | B2 | 11/2019 | Evaristo | |
| 11,209,069 | B1 * | 12/2021 | Wu | F16F 15/28 |
| 2002/0189569 | A1 * | 12/2002 | Jee | F16F 15/145 |
| | | | | 123/192.2 |
| 2007/0108834 | A1 * | 5/2007 | Fogal, Sr. | F16F 15/324 |
| | | | | 301/5.22 |
| 2010/0307286 | A1 * | 12/2010 | Huang | F16F 15/30 |
| | | | | 74/572.21 |
| 2012/0205997 | A1 * | 8/2012 | Hansen | H02K 21/24 |
| | | | | 310/64 |
| 2012/0291589 | A1 | 11/2012 | Jayakar et al. | |
| 2013/0152728 | A1 | 6/2013 | Gottfried | |
| 2020/0130820 | A1 * | 4/2020 | Heverly | B64C 11/008 |

* cited by examiner

VARIABLE INERTIA FLYWHEEL APPARATUS AND SYSTEM

FIELD OF THE DISCLOSURE

The present disclosure is related to flywheels and, more particularly, to flywheel apparatus having a flywheel body configured to receive one or more tuning members that may be selectively added onto the flywheel body for providing a flywheel system having a variable selectable inertia, and to flywheel systems including in combination a flywheel body and one or more tuning members. Although the descriptions herein are directed to flywheels disposed between an engine and a transmission of a work vehicle such as a tractor, it is to be appreciated that the claimed invention has a much broader range of applications including as examples, use in stationary powered machines that use flywheels and work vehicles of any type that use flywheels.

BACKGROUND

A flywheel is a component of an engine that connects with a transmission component such as for example a clutch, a coupler, a torque convertor or other similar devices to transmit power via the transmission component to devices such as electric or hydraulic generators, compressors, power take-off (PTO) devices and/or to other devices such as ground engaging members of a work vehicle such as tires or treads of a tractor for example. The inertia inherent in a rotating flywheel helps to minimize energy fluctuations by storing energy in the rotating flywheel mass while energy in the overall system is in excess, and by dissipating or paying out the stored energy to the devices when it is required by the devices such as to drive the PTO devices and/or ground engaging members. The inertia inherent in the rotating flywheel also helps to minimize torsional vibrations in the crankshaft, and as such has a tuning effect on the engine. As a result, inertia is a very important parameter for flywheel design.

Flywheel assemblies typically also consist of ring gear to mesh with a starter pinion and machined part. A starter motor pinion rotates flywheel to set engine in motion at the time of ignition. Flywheel assemblies also typically consists of interfaces for selective connection on one side with the crankshaft of an engine of a work vehicle or stationary equipment, and on the other and opposite side with the transmission or other power transfer mechanisms of the work vehicle or the stationary equipment. In some cases different work vehicles may use the same engine and transmission combination but may require different flywheels having different inertia characteristics because of different applications and/or because of the different sizes or constructions of the different work vehicles even though the engines and transmissions may be shared across those products. In cases such as this, an original equipment manufacturer (OEM) might be required to manufacture, inventory, and catalog flywheels that have different rotating inertial mass characteristics even though the physical interfaces to the end use devices are identical across the different flywheels having the different inertia characteristics.

In addition to the above, there is sometimes a need to change or otherwise modify the inertial characteristics of a flywheel design for different applications or when same application is intended to be used for different transmission clutches or couplers. Quite often these inertia changes that may be needed are not recognized by the OEMs until after flywheel development such as during the time period afterwards when vehicle partners continue to experiment with couplers in the test labs or field. Some OEMs have addressed the above problem by offering inertia rings that may be attached to the flywheels such as by bolting or otherwise coupling the inertia ring to the flywheel. Today, applications often settle for use of an inertia ring located on transmission couplers which is new development so there is some cost and lead time associated with it. However, the inertia rings themselves present manufacturing, inventory and sales catalog problems. They are also time consuming and difficult to install. Sometimes it is learned that applications require a new flywheel development. In this case several part numbers and associated costs are added in the OEM system.

It is therefore desirable to provide a flywheel apparatus having a flywheel body configured to receive one or more members that may be selectively added onto the flywheel body for providing a flywheel system having a variable selectable inertia.

It is further desirable to provide flywheel system including a flywheel apparatus and one or more members that may be selectively added to the flywheel apparatus for effecting selectable inertial characteristics.

It is further desirable to provide a flywheel system having an inertial characteristic that can be easily modified to provide a different selected inertial characteristic.

It is further desirable to provide a flywheel system including a flywheel body and one or more add-on inertial masses that may be selectively added to the inertial mass of the flywheel body for adjusting the inertial characteristics of a flywheel as may be necessary and/or desired by adding or removing one or more of the add-on inertial masses relative to the flywheel body.

SUMMARY

The embodiments herein provide a variable inertia flywheel apparatus.

The embodiments herein further provide a variable inertia flywheel system including a variable inertia flywheel apparatus and one or more tuning weights.

The embodiments herein further provide a flywheel system having add-on inertial masses for adjusting the inertial characteristics of a flywheel as may be necessary and/or desired by adding or removing one or more of the add-on inertial masses.

The embodiments herein further provide a variable inertia flywheel apparatus having a flywheel body configured to receive one or more members, wherein the inertia of the flywheel apparatus may be varied as may be necessary and/or desired by adding or removing one or more of the add-on inertial masses onto the flywheel body.

The embodiments herein further provide a variable inertia flywheel system including one or more members and a flywheel apparatus having a flywheel body configured to receive the one or more members, herein the inertia of the flywheel system may be varied as may be necessary and/or desired by adding or removing one or more of the add-on inertial masses onto the flywheel body of the flywheel apparatus.

In one aspect, a variable inertia flywheel apparatus is provided including a cylindrical body member defining a longitudinal axis extending between spaced apart front and rear faces of the cylindrical body member, and an arc-shaped groove portion extending circumferentially relative to the longitudinal axis, wherein the arc-shaped groove portion is configured to selectively receive an associated tuning weight having a mass sufficient to vary an inertial property of the cylindrical body member between a first inertial property with the associated tuning weight selectively removed from the arc-shaped groove portion and a second inertial property greater than the first inertial property with the associated tuning weight selectively received in the arc-shaped groove portion.

In any of the embodiments herein, the tuning weight includes one or more tuning weight bodies.

In any of the embodiments herein, the variable inertia flywheel apparatus further includes a biasing member disposed in the arc-shaped groove portion, wherein the biasing member is operable to hold the associated tuning weight in a predetermined position relative to the arc-shaped groove portion.

In any of the embodiments herein, the biasing member includes a spring device operable to hold first and second sets of tuning weight bodies of the associated tuning weight in respective predetermined positions at opposite ends of the arc-shaped groove portion.

In any of the embodiments herein, the arc-shaped groove portion defined by the cylindrical body member of the variable inertia flywheel apparatus includes an arc-shaped passageway portion defined by the cylindrical body member and extending circumferentially relative to the longitudinal axis, and a fill passageway portion defined by the cylindrical body member and extending substantially in parallel with the longitudinal axis, wherein in any of the embodiments herein the fill passageway portion includes a source aperture on an outer end of the fill passageway portion opening the fill passageway portion to the first face of the cylindrical body member, and a supply aperture on an inner end of the fill passageway portion and in communication with the arc-shaped passageway portion of the arc-shaped groove portion. The source aperture is adapted to, capable of, and/or configured to receive the associated tuning weight into the cylindrical body member. The supply aperture is adapted to, capable of, and/or configured to communicate the associated tuning weight between the fill passageway portion and the arc-shaped passageway portion of the arc-shaped groove portion.

In any of the embodiments herein, the arc-shaped passageway portion of the variable inertia flywheel apparatus includes a closed arc-shaped passageway portion in communication with the fill passageway portion and, in any of the embodiments herein, the supply aperture of the variable inertia flywheel apparatus defines a sole pathway of ingress and egress of the associated tuning weight relative to the arc-shaped passageway portion.

In any of the embodiments herein, the variable inertia flywheel apparatus further includes a biasing member disposed in the arc-shaped passageway portion, wherein the biasing member is operable to hold first and second sets of tuning weight bodies of the associated tuning weight in predetermined positions at opposite ends of the arc-shaped passageway portion.

In any of the embodiments herein, the arc-shaped groove portion defined by the cylindrical body member of the variable inertia flywheel apparatus includes a first arc-shaped passageway portion defined by the cylindrical body member and extending circumferentially relative to the longitudinal axis on a first side of a plane bisecting the cylindrical body member and containing the longitudinal axis. Further in any of the embodiments herein, the arc-shaped groove portion defined by the cylindrical body member of the variable inertia flywheel apparatus includes a second arc-shaped passageway portion defined by the cylindrical body member and extending circumferentially relative to the longitudinal axis on a second side opposite from the first side of the plane bisecting the cylindrical body member and containing the longitudinal axis In any of the embodiments herein, the first arc-shaped passageway portion of the variable inertia flywheel apparatus is spaced from the longitudinal axis by a first radius, and the second arc-shaped passageway portion of the variable inertia flywheel apparatus is spaced from the longitudinal axis by a second radius, wherein the first and second radii are the same.

In any of the embodiments herein, the first arc-shaped passageway portion of the variable inertia flywheel apparatus is spaced from the longitudinal axis by a first radius, and the second arc-shaped passageway portion of the variable inertia flywheel apparatus is spaced from the longitudinal axis by a second radius, wherein the first and second radii are the different.

In any of the embodiments herein, the variable inertia flywheel apparatus further includes first and second biasing members, wherein the first biasing member is disposed in the first arc-shaped passageway portion, and the second biasing member is disposed in the second arc-shaped passageway portion. In any of the embodiments herein, the first biasing member is operable to hold first and second sets of tuning weight bodies of the associated tuning weight in respective predetermined positions at opposite ends of the first arc-shaped passageway portion, and in any of the embodiments herein, the second biasing member is operable to hold third and fourth sets of tuning weight bodies of the associated tuning weight in respective predetermined positions at opposite ends of the second arc-shaped passageway portion.

In any of the embodiments herein, the arc-shaped groove portion defined by the cylindrical body member of the variable inertia flywheel apparatus includes first and second fill passageway portions, wherein the first fill passageway portion extends substantially in parallel with the longitudinal axis, and includes a first source aperture on an outer end of the first fill passageway portion opening the first fill passageway portion to the first face of the cylindrical body member. In any of the embodiments herein, the first source aperture is adapted to, capable of, and/or configured to receive first and second sets of tuning weight bodies of the associated tuning weight into the cylindrical body member. In any of the embodiments herein, the first fill passageway portion includes a first supply aperture on an inner end of the first fill passageway portion and in communication with the first arc-shaped passageway portion of the arc-shaped groove portion, the first supply aperture being adapted to, capable of, and/or configured to communicate the first and second sets of tuning weight bodies of the associated tuning weight between the first fill passageway portion and the first arc-shaped passageway portion. The second fill passageway portion extends substantially in parallel with the longitudinal axis and includes a second source aperture on an outer end of the second fill passageway portion opening the second fill passageway portion to the first face of the cylindrical body member. The second source aperture is adapted to, capable of, and/or configured to receive third and fourth sets of tuning weight bodies of the associated tuning weight into the cylindrical body member. The second fill passageway portion includes a second supply aperture on an inner end of the second fill passageway portion and in communication with the second arc-shaped passageway portion of the arc-shaped groove portion. The second supply aperture is adapted to, capable of, and/or configured to communicate the third and fourth sets of tuning weight bodies of the associated tuning weight between the second fill passageway portion and the second arc-shaped passageway portion.

In any of the embodiments herein, the arc-shaped groove portion defined by the cylindrical body member of the variable inertia flywheel apparatus includes first and second arc-shaped passageway portions, wherein the first arc-shaped passageway portion defined by the cylindrical body member extends circumferentially relative to the longitudinal axis on a first side of a plane bisecting the cylindrical body member and containing the longitudinal axis. The first arc-shaped passageway portion is configured to receive first and second sets of tuning weight bodies of the associated tuning weight. The second arc-shaped passageway portion defined by the cylindrical body member extends circumferentially relative to the longitudinal axis on the first side of the plane bisecting the cylindrical body member and containing the longitudinal axis, wherein the second arc-shaped passageway portion is configured to receive third and fourth sets of tuning weight bodies of the associated tuning weight.

In any of the embodiments herein, the first arc-shaped passageway portion of the variable inertia flywheel apparatus is spaced from the longitudinal axis by a first radius, and the second arc-shaped passageway portion of the variable inertia flywheel apparatus is spaced from the longitudinal axis by a second radius different than the first radius.

In any of the embodiments herein, the first arc-shaped passageway portion of the variable inertia flywheel apparatus is spaced from the longitudinal axis by a first radius, and the second arc-shaped passageway portion of the variable inertia flywheel apparatus is spaced from the longitudinal axis by a second radius the same as the first radius.

In any of the embodiments herein, the variable inertia flywheel apparatus further includes first and second biasing members, wherein the first biasing member is disposed in the first arc-shaped passageway portion and is operable to hold the first and second sets of tuning weight bodies of the associated tuning weight in predetermined positions at opposite ends of the first arc-shaped passageway portion, and wherein the second biasing member is disposed in the second arc-shaped passageway portion and is operable to hold the third and fourth sets of tuning weight bodies of the associated tuning weight in predetermined positions at opposite ends of the second arc-shaped passageway portion.

In any of the embodiments herein, the arc-shaped groove portion defined by the cylindrical body member of the variable inertia flywheel apparatus includes third and fourth arc-shaped passageway portions, wherein the third arc-shaped passageway portion extends circumferentially relative to the longitudinal axis on a second side opposite from the first side of the plane bisecting the cylindrical body member and containing the longitudinal axis, and is configured to receive a third tuning weight body of the associated tuning weight. The fourth arc-shaped passageway portion extends circumferentially relative to the longitudinal axis on the second side of the plane bisecting the cylindrical body member and containing the longitudinal axis, and is configured to receive a fourth tuning weight body of the associated tuning weight.

In any of the embodiments herein, the first arc-shaped passageway portion of the variable inertia flywheel apparatus is spaced from the longitudinal axis by a first radius, the second arc-shaped passageway portion of the variable inertia flywheel apparatus is spaced from the longitudinal axis by a second radius less than the first radius, the third arc-shaped passageway portion of the variable inertia flywheel apparatus is spaced from the longitudinal axis by a third radius, and the fourth arc-shaped passageway portion of the variable inertia flywheel apparatus is spaced from the longitudinal axis by a fourth radius less than the third radius.

In any of the embodiments herein, the first and third radii of the first arc-shaped passageway portion of the variable inertia flywheel apparatus are the same, and the second and fourth radii of the second arc-shaped passageway portion of the variable inertia flywheel apparatus are the same.

In any of the embodiments herein, the second inertial property of the cylindrical body member variable inertia flywheel apparatus with the associated tuning weight received in the arc-shaped groove portion remains unchanged and/or otherwise fixed for any position of the associated tuning weight along the arc-shaped groove portion of the cylindrical body member.

In any of the embodiments herein, the second inertial property of the cylindrical body member variable inertia flywheel apparatus with one or more associated tuning weight(s) received in any selected one of the one or more arc-shaped groove portion(s) remains unchanged and/or otherwise fixed for any position of the associated one or more tuning weight(s) along the respective arc-shaped groove portion of the selected one of the one or more arc-shaped groove portions of the cylindrical body member.

In a further aspect, a variable inertia flywheel system is provided including a flywheel apparatus having cylindrical body member, and a tuning weight having a mass. The cylindrical body member defines a longitudinal axis extending between spaced apart front and rear faces of the cylindrical body member, and an arc-shaped groove portion extending circumferentially relative to the longitudinal axis. The arc-shaped groove portion is configured to selectively receive one or more tuning weights wherein the one or more tuning weights have a collective mass sufficient to vary an inertial property of the cylindrical body member between a first inertial property with the one or more of the plurality of tuning weights selectively removed from the arc-shaped groove portion and a second inertial property greater than the first inertial property with the one or more of the plurality of tuning weights selectively received in the arc-shaped groove portion.

In any of the embodiments herein, the variable inertia flywheel system includes one or more tuning weight(s), each having a mass, and a flywheel apparatus in accordance with any of the embodiments described herein.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

DETAILED DESCRIPTION

The following describes one or more example embodiments of the disclosed variable inertia flywheel apparatus for work vehicles, and of the disclosed variable inertia flywheel system including the disclosed variable inertia flywheel apparatus in combination with one or more tuning weight members, as shown in the accompanying figures of the drawings described briefly above. Various modifications to the example embodiments may be contemplated by one of skill in the art.

Figure 1:
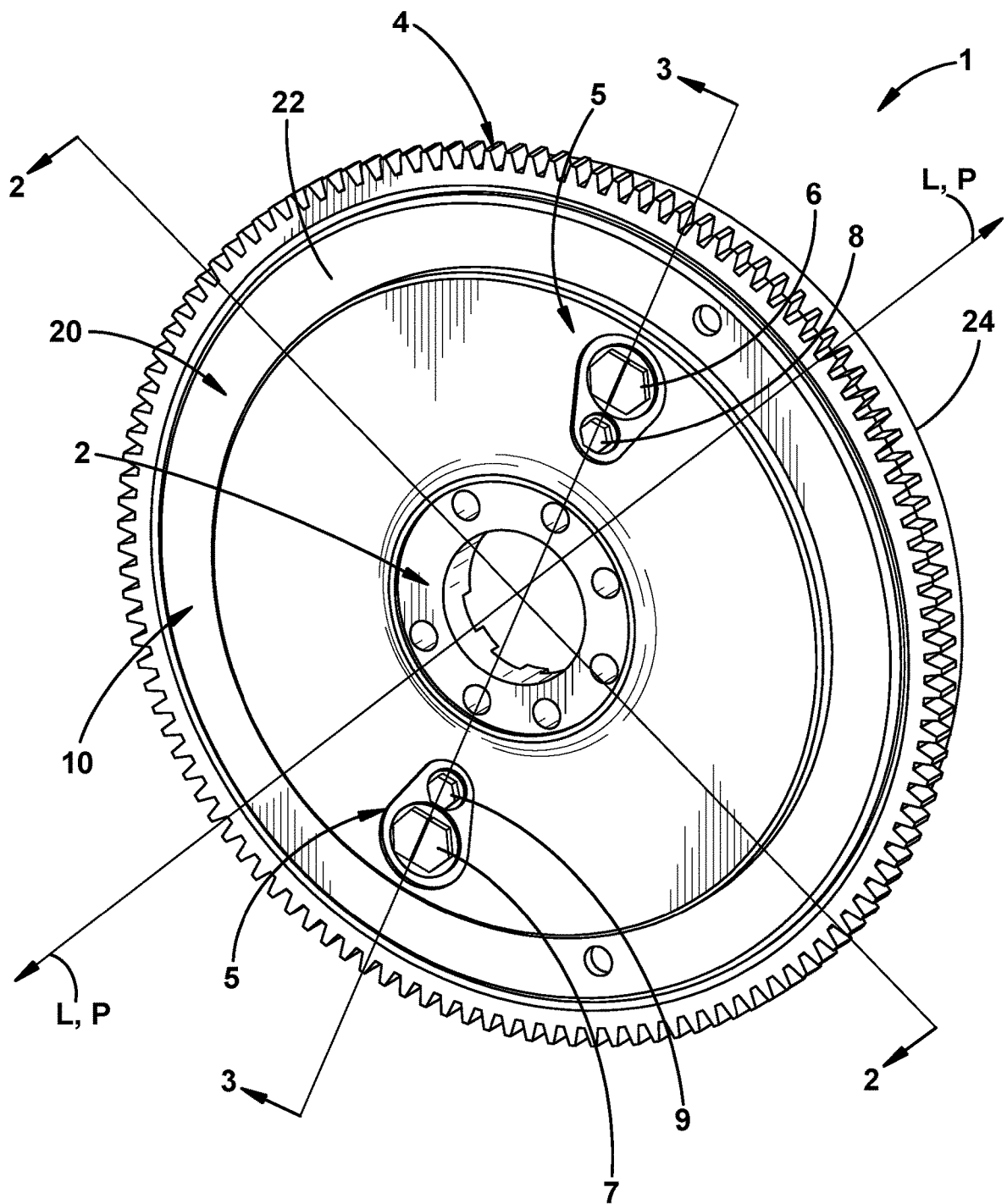
FIG. 1 is a schematic perspective illustration showing a variable inertia flywheel system in accordance with an example embodiment.

FIG. 1 shows a variable inertia flywheel system 1 in accordance with an example embodiment including one or more associated tuning weights (not shown in FIG. 1), and a variable inertia flywheel apparatus 10 in accordance with an example embodiment. As shown there, the flywheel apparatus 10 includes a cylindrical body member 20 defining a longitudinal axis L extending between spaced apart front and rear faces 22, 24 of the cylindrical body member 20. The variable inertia flywheel apparatus 10 includes a first coupling interface 2 provided on the front face 22 of the cylindrical body member 20, and a second coupling interface 3 (FIGS. 2, 3) provided on the rear face 24 of the cylindrical body member 20. The first coupling interface 2 enables the flywheel apparatus 10 of the variable inertia flywheel system 1 to be attached with an associated drivetrain mechanism such as for example a crankshaft of an engine (not shown) of a work vehicle, and the second coupling interface 3 enables the flywheel apparatus 10 of the variable inertia flywheel system 1 to be attached with a further associated drivetrain mechanism such as for example a clutch or torque converter of a transmission (not shown) of the work vehicle. In addition, an integrated circular ring gear 4 is provided on an outer extent of the cylindrical body member 20 for engaging a control mechanism of an associated work vehicle such as for example a starter motor (not shown).

The novel variable inertia flywheel apparatus 10 of the variable inertia flywheel system 1 in accordance with an example embodiment includes a cylindrical body member 20 that defines at least one arc-shaped groove portion extending circumferentially relative to the longitudinal axis L, wherein the at least one arc-shaped groove portion is adapted to selectively receive an associated tuning weight 40 (FIGS. 2-4) having a mass whereby an inertial property of the cylindrical body member 20 is selectively varied from a first inertial characteristic before the associated tuning weight is selectively added to the arc-shaped groove portion to a second inertial characteristic greater than the first inertial characteristic when the associated tuning weight is selectively received in the arc-shaped groove portion. Similarly, removal of the associated tuning weight from the arc-shaped groove portion varies the inertial property of the cylindrical body member from the second inertial characteristic greater to the first inertial characteristic when the associated tuning weight is selectively removed from the arc-shaped groove portion. In any of the embodiments herein, the second inertial property of the cylindrical body member variable inertia flywheel apparatus with one or more associated tuning weight(s) received in any selected one of the at least one arc-shaped groove portion(s) remains unchanged and/or otherwise fixed for any position of the associated one or more tuning weight(s) along the respective arc-shaped groove portion of the selected one of the at least one arc-shaped groove portions of the cylindrical body member.

In a further embodiment the at least one arc-shaped groove portion includes a plurality of arc-shaped groove portions each extending circumferentially relative to the longitudinal axis L, wherein each of the plurality of arc-shaped groove portions is adapted to selectively receive at least one associated tuning weight having a mass whereby the inertial property of the cylindrical body member 20 is selectively varied from a first inertial characteristic before the one or more associated tuning weights are selectively added to a selected arc-shaped groove portion of the plurality of arc-shaped groove portions to a second inertial characteristic greater than the first inertial characteristic when the one or more associated tuning weights are selectively received in the selected arc-shaped groove portion.

In the example embodiments herein, the arc-shaped groove portion defined by the cylindrical body member is adapted to, capable of, and/or otherwise configured to selectively receive one or more associated tuning weight(s), each having a mass sufficient to vary an inertial property of the cylindrical body member between first and second inertial properties. That is, the arc-shaped groove portion defined by the cylindrical body member is designed or constructed to receive and hold the one or more associated tuning weight(s) on, in or within the arc-shaped groove portion 30 (FIGS. 2-4).

In the example embodiments herein, the inertial property of the cylindrical body member 20 with the one or more associated tuning weights received in an arc-shaped groove portion remains unchanged and/or otherwise fixed or constant or equivalent for any position of the one or more associated tuning weights 40 along the arc-shaped groove portion 30 of the cylindrical body member 20.

The variable inertia flywheel system 1 of the example embodiment includes a set of cover or closure devices such as for example plugs 5 provided in the example embodiment for selective connection with the variable inertia flywheel apparatus 10 for covering fill passageways configured to receive the one or more of the tuning weights into the cylindrical body member 20 to thereby selectively vary the inertia of the flywheel apparatus 10 between an initial or first inertial characteristic and a selected or second inertial characteristic as may be necessary and/or desired by adding or removing one or more of the tuning weights onto the cylindrical body member 20. The set of plugs 5 may include a pair of outer plugs 6, 7, and a similar pair of inner plugs 8, 9. The pairs of outer and inner plugs 6, 7 and 8, 9 are configured to receive one or more of the tuning weights 40 into the cylindrical body member 20.

Figure 2:
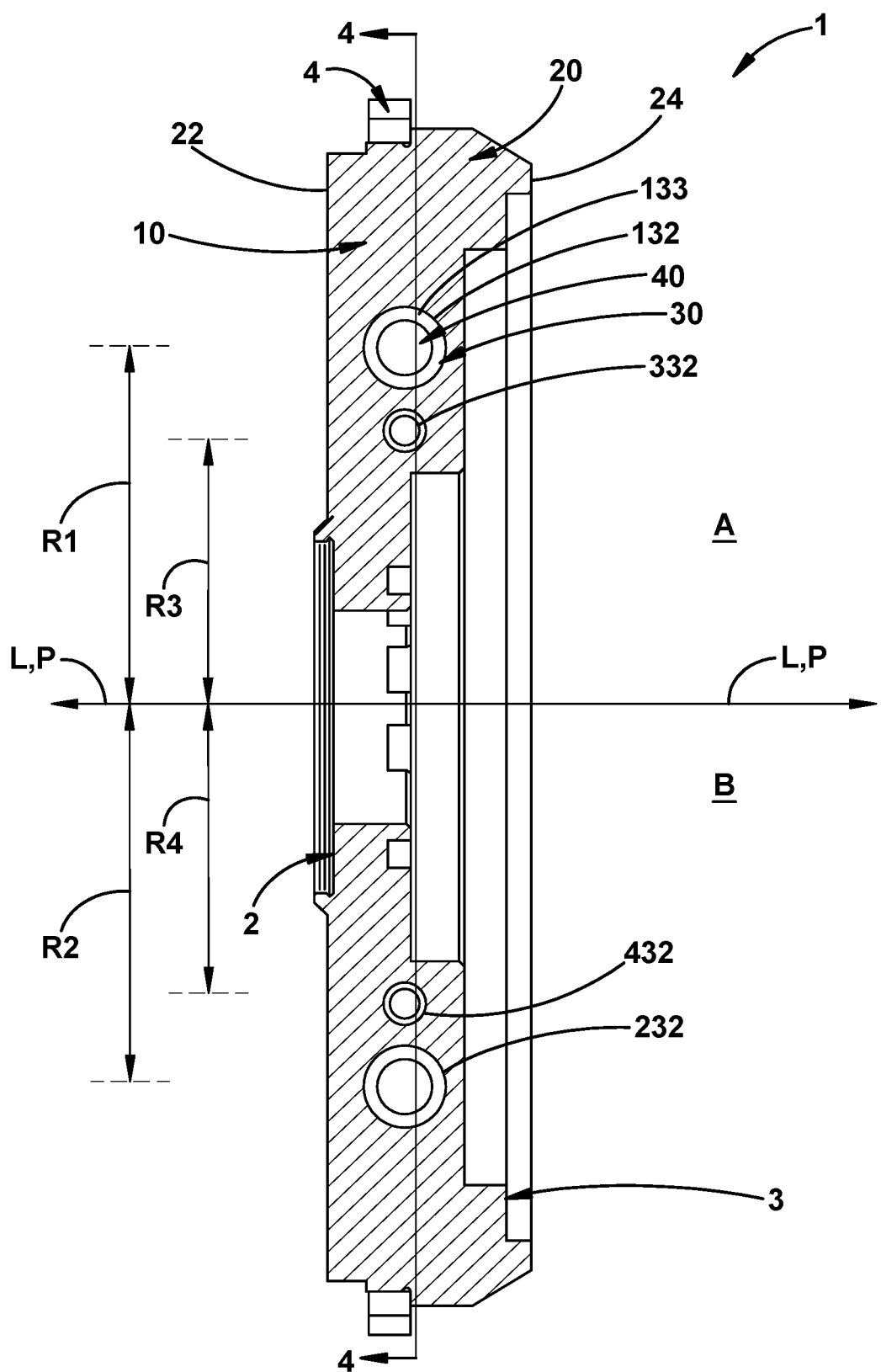
FIG. 2 is a cross-sectional view of the variable inertia flywheel system of FIG. 1 in accordance with an example embodiment taken along line 2-2 of FIG. 1.
Figure 3:
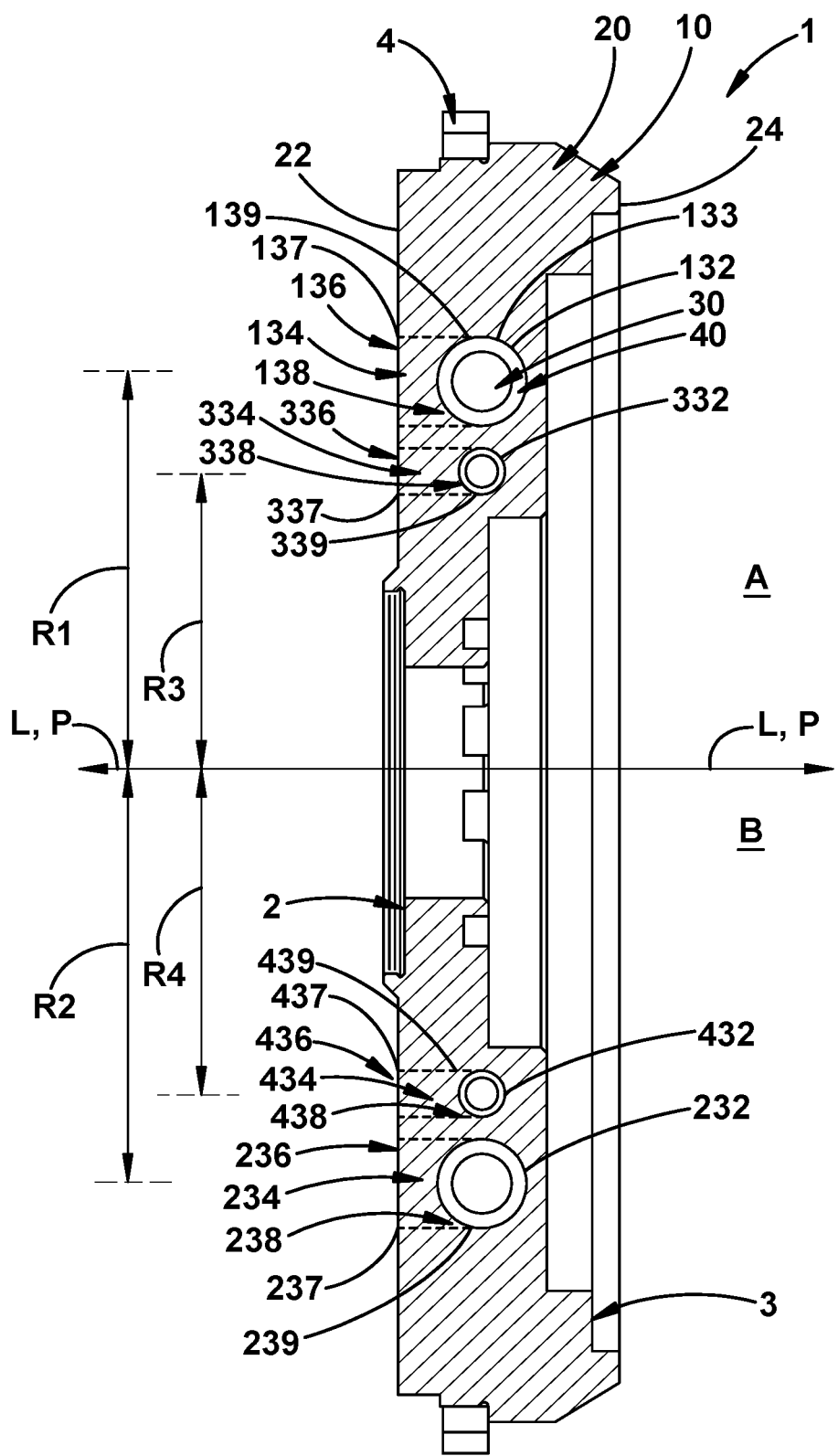
FIG. 3 is a cross-sectional view of the variable inertia flywheel system of FIG. 1 in accordance with an example embodiment taken along line 3-3 of FIG. 1.
Figure 4:
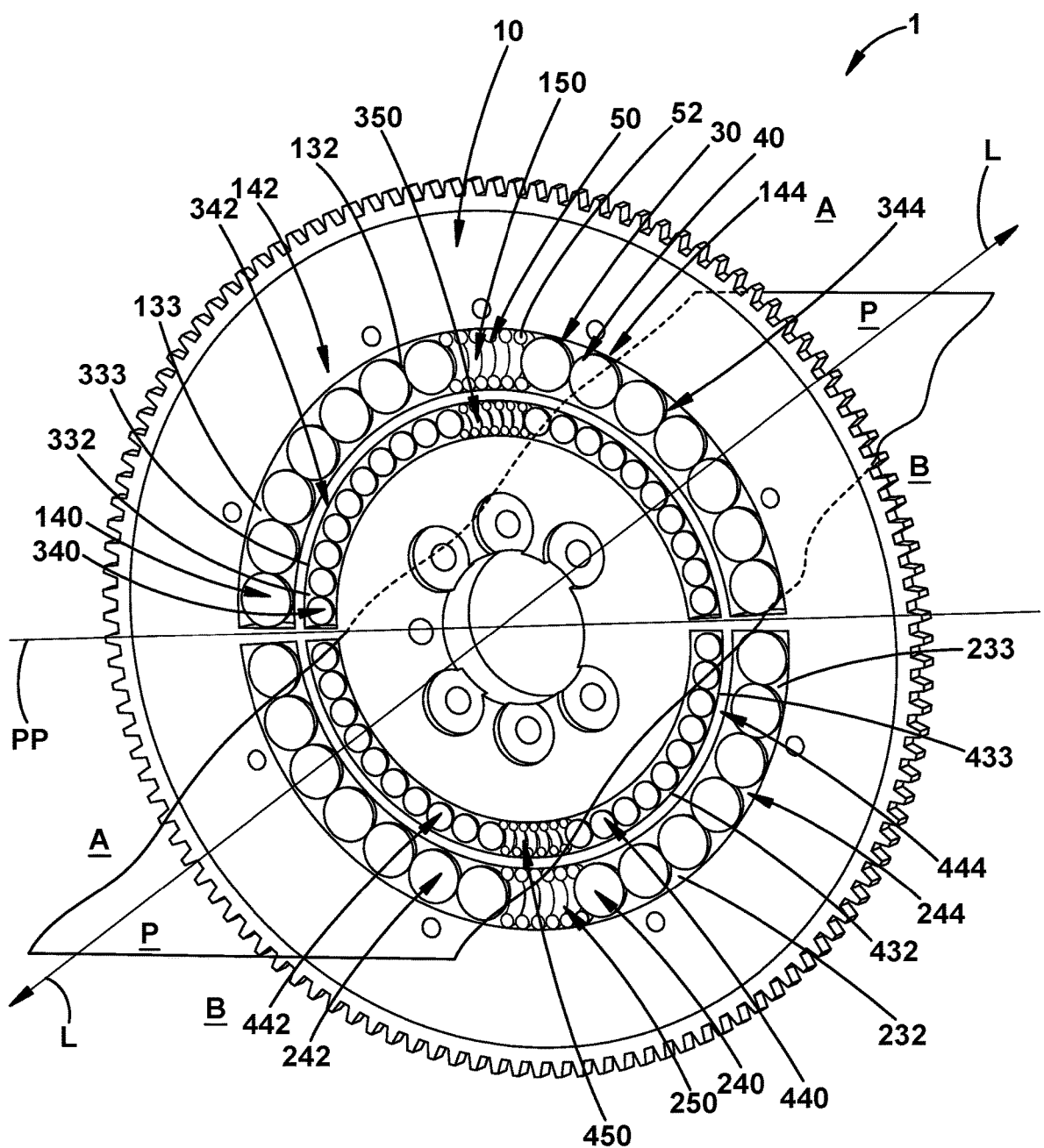
FIG. 4 is a cross-sectional view of the variable inertia flywheel system of FIG. 1 in accordance with an example embodiment taken along line 4-4 of FIG. 2.

FIG. 2 is a cross sectional view of the variable inertia flywheel system 1 of FIG. 1 in accordance with an example embodiment taken along line 2-2 of FIG. 1 and, similarly, FIG. 3 is a cross sectional view of the variable inertia flywheel system 1 of FIG. 1 taken along line 3-3 of FIG. 1. In addition, FIG. 4 is a cross sectional view of the variable inertia flywheel system 1 of FIG. 1 taken along line 4-4 in FIG. 2. It is to be appreciated that in one embodiment a variable inertia flywheel apparatus 10 is provided comprising a cylindrical body member 20 defining a longitudinal axis L extending between spaced apart front 22 and rear 24 faces of the cylindrical body member 20, and an arc-shaped groove portion 30 extending circumferentially relative to the longitudinal axis L, wherein the arc-shaped groove portion 30 defined by the cylindrical body member 20 is adapted to, capable of, and/or otherwise configured to selectively receive an associated tuning weight 40 by the cylindrical body member being designed or constructed to receive and hold on, in, or within the arc-shaped groove portion 30 the one or more associated tuning weight(s) having a mass sufficient to vary an inertial property of the cylindrical body member 20 between a first inertial property with the associated tuning weight 40 selectively removed from the arc-shaped groove portion 30, and a second inertial property greater than the first inertial property with the associated tuning weight 40 selectively received in the arc-shaped groove portion 30. It is also to be appreciated that in accordance with a further embodiment, a variable inertia flywheel system 1 is provided comprising one or more tuning weights 40 in combination with a variable inertia flywheel apparatus 10 of the various example embodiments described herein.

The cross-sectional views of the variable inertia flywheel system 1 in accordance with the example embodiments shown in FIGS. 2-4 show the associated tuning weight 40 in the form of one or more spherical objects that are loosely received in the one or more arc-shaped groove portions for ease of illustration and description. It is to be understood that in practice, the spherical objects that are preferably tightly received in the one or more arc-shaped groove portions so that they do not move, rattle, or otherwise dislocate from their intended position(s) within the groove portions during use of the flywheel system 1. The spherical objects may be cooled to very low temperature such as my immersing them in liquid nitrogen for example so that they may reduce in size by shrinking before insertion into the groove portions, then allowed to expand in situ after they are properly located to their respective desired position(s) within the groove portions.

With reference to drawing FIGS. 1-4, the variable inertia flywheel apparatus 10 of the example embodiment comprises a cylindrical body member 20 defining a longitudinal axis L extending between spaced apart front and rear faces 22, 24 of the cylindrical body member 20, and an arc-shaped groove portion 30 extending circumferentially relative to the longitudinal axis L. In an example embodiment, the arc-shaped groove portion 30 defined by the cylindrical body member 20 is a partial circular arc centered about the longitudinal axis L. In an example embodiment, the arc-shaped groove portion 30 may define a partial toroidal space within the cylindrical body member 20 and having an axis of rotation centered about the longitudinal axis L. In a further example embodiment, the arc-shaped groove portion 30 defined by the cylindrical body member 20 is a complete uninterrupted circular arc centered about the longitudinal axis L. In a stull further example embodiment, the arc-shaped groove portion 30 may define a toroidal space within the cylindrical body member 20 and having an axis of complete or otherwise full rotation centered about the longitudinal axis L.

As will be described in greater detail below, the associated tuning weight 40 may include one or more tuning weight bodies and/or one or more sets of tuning weight bodies, wherein each of the sets of tuning weight bodies may include one or more tuning weight bodies. In accordance with the example embodiment, the tuning weight bodies are a plurality of metal balls such as for example a plurality of metal ball bearings, collectively referred to herein from time to time as an associated tuning weight 40. The use of a plurality of metal ball bearings as the plurality of metal balls collectively providing the associated tuning weight 40 in accordance with the example embodiment is beneficial for many reasons including because metal ball bearings are readily available in many sizes, and also because they are relatively inexpensive. In addition, metal ball bearings are essentially insensitive to heat, and their physical properties including importantly their inertial mass properties do not degrade or otherwise change over time or during use even in challenging environments and applications. In the example embodiment all of the tuning weight bodies are metal balls. However, it is to be appreciated that some of the metal ball bearings may be substituted with tuning weights formed from other materials and also in shapes other than spherical as may be necessary to achieve a desired inertial characteristic result of the flywheel body member. As an example some of the tuning weight bodies may be metal balls and others of the tuning weight bodies may be hard plastic balls or balls formed of other materials having the necessary temperature and other environmental properties and also having a reduced mass characteristic relative to the metal balls. In this way the tuning weight bodies having the lower mass characteristic may be intermixed with metal ball bearings having a higher mass characteristic so that a range of desired inertial characteristic results of the flywheel body member may be obtained. In other example embodiments, some of the tuning weight bodies may be formed of a first type of metal having a first density and others of the tuning weight bodies may be formed of a second type of metal having a second density different than the first density so that the differently formed metal balls may be intermixed as necessary of desired to result in a range of desired inertial characteristic results of the flywheel body member may be obtained. In still further example embodiments, all of the tuning weight bodies may be formed of a material having the same density, but some of the tuning weight bodies may have different sizes relative to others of the tuning weight bodies. Any combination of size and/or density of the tuning weight bodies may be used in accordance with the example embodiment for effecting a flywheel system or assembly including a flywheel body and one or more add-on inertial masses that may be selectively secured to the flywheel body for adjusting the inertial characteristics of a flywheel as may be necessary and/or desired by adding or removing one or more of the add-on inertial masses.

In addition to the above, the variable inertia flywheel apparatus 10 in accordance with the example embodiment further includes a biasing member 50 disposed in the arc-shaped groove portion 30 as shown best in FIG. 4. In the example, the biasing member 50 is a resilient device operable to store energy by being compressed and to then use the stored energy to hold the associated tuning weight 40 in a predetermined position relative to the arc-shaped groove portion 30. In particular and in an example, the biasing member 50 of the example shown includes a spring device 52 operable to hold first and second sets 142, 144 of tuning weight bodies of the associated tuning weight 40 in respective predetermined positions relative to the arc-shaped groove portion 30. In the example embodiment the biasing member 50 of the example shown including the spring device 52 is operable to hold first and second sets 142, 144 of tuning weight bodies of the associated tuning weight 40 in respective predetermined positions at opposite ends of the arc-shaped groove portion 30. It is to be appreciated however that other devices such as resilient compressible members, small screw jacks or the like may be used as well to hold the associated tuning weight 40 in a predetermined position relative to the arc-shaped groove portion 30.

In the example embodiment illustrated, the arc-shaped groove portion 30 defined by the cylindrical body member 20 of the variable inertia flywheel apparatus 10 includes an arc-shaped passageway portion 132 (FIGS. 2-4) and a fill passageway portion 134 (FIG. 3). The arc-shaped and fill passageway portions 132, 134 are defined by the cylindrical body member 20, wherein and as shown, the arc-shaped passageway portion 132 extends circumferentially relative to the longitudinal axis L, and the fill passageway portion 134 extends substantially in parallel with the longitudinal axis L. In the example embodiment the arc-shaped passageway portion 132 extends circumferentially along a circle having a first radius R1 relative to the longitudinal axis L. Further in the example embodiment and as best shown in FIG. 3, the fill passageway portion 134 comprises a source aperture 136 on an outer end 137 of the fill passageway portion 134 opening the fill passageway portion 134 to the first face 22 of the cylindrical body member 20, and a supply aperture 138 on an inner end 139 of the fill passageway portion 134 and in communication with the arc-shaped passageway portion 132 of the arc-shaped groove portion 30. The source aperture 136 is configured to receive the associated tuning weight 40 into the cylindrical body member 20, and the supply aperture 138 is configured to communicate the associated tuning weight 40 between the fill passageway portion 134 and the arc-shaped passageway portion 132 of the arc-shaped groove portion 30. In an example embodiment, the source aperture 136 is configured to receive the first and second sets 142, 144 of tuning weight bodies of the associated tuning weight 40 into the cylindrical body member 20, and the supply aperture 138 is configured to communicate the first and second sets 142, 144 of tuning weight bodies of the associated tuning weight 40 between the fill passageway portion 134 and the arc-shaped passageway portion 132 of the arc-shaped groove portion 30.

Also in the example embodiment illustrated, the arc-shaped groove portion 30 defined by the cylindrical body member 20 of the variable inertia flywheel apparatus 10 includes a second arc-shaped passageway portion 232 (FIGS. 2-4) and a second fill passageway portion 234 (FIG. 3). The second arc-shaped and fill passageway portions 232, 234 are defined by the cylindrical body member 20, wherein and as shown, the second arc-shaped passageway portion 232 extends circumferentially along a circle having a first radius R2 relative to the longitudinal axis L, and the second fill passageway portion 234 extends substantially in parallel with the longitudinal axis L. In the example embodiment the second arc-shaped passageway portion 232 extends circumferentially along a circle having a second radius R2 relative to the longitudinal axis L. As illustrated, the second radius R2 of the second arc-shaped passageway portion 232 is the same as the first radius R1 of the first arc-shaped passageway portion 132 but it is to be appreciated that the radii R1 and R2 can be different as may be desired. In addition, for embodiments wherein the radii R1 and R2 are the same, the first and second arc-shaped passageway portions 132, 232 may be continuous or equivalently formed as a single arc-shaped passageway portion extending a full 360° circle of revolution about the longitudinal axis L of the cylindrical body member 20. In still further addition, for embodiments wherein the first and second radii R1 and R2 are not the same, the first and second arc-shaped passageway portions 132, 232 may be discontinuous or equivalently formed as single separate arc-shaped passageway portions extending up to a full 360° circle of revolution about the longitudinal axis L of the cylindrical body member 20, but spaced apart from the longitudinal axis L by the difference between their respective first and second radii R1 and R2. Further in the example embodiment and as best shown in FIG. 3, the second fill passageway portion 234 comprises a second source aperture 236 on an outer end 237 of the fill passageway portion 234 opening the fill passageway portion 234 to the first face 22 of the cylindrical body member 20, and a second supply aperture 238 on an inner end 239 of the fill passageway portion 234 and in communication with the arc-shaped passageway portion 232 of the arc-shaped groove portion 30. The second source aperture 236 is configured to receive the associated tuning weight 40 into the cylindrical body member 20, and the second supply aperture 238 is configured to communicate the associated tuning weight 40 between the fill passageway portion 234 and the arc-shaped passageway portion 232 of the arc-shaped groove portion 30. In an example embodiment, the source aperture 236 is configured to receive third and fourth sets 242, 244 of tuning weight bodies of the associated tuning weight 40 into the cylindrical body member 20, and the supply aperture 238 is configured to communicate the third and fourth sets 242, 244 of tuning weight bodies of the associated tuning weight 40 between the fill passageway portion 234 and the arc-shaped passageway portion 232 of the arc-shaped groove portion 30.

Also the example embodiment illustrated, the arc-shaped groove portion 30 defined by the cylindrical body member 20 of the variable inertia flywheel apparatus 10 includes a third arc-shaped passageway portion 332 (FIGS. 2-4) and a third fill passageway portion 334 (FIG. 3). The third arc-shaped and fill passageway portions 332, 334 are defined by the cylindrical body member 20, wherein and as shown, the arc-shaped passageway portion 332 extends circumferentially relative to the longitudinal axis L, and the fill passageway portion 334 extends substantially in parallel with the longitudinal axis L. In the example embodiment the third arc-shaped passageway portion 332 extends circumferentially along a circle having a third radius R3 relative to the longitudinal axis L. As illustrated, the third radius R3 is smaller than the first and second radii R1, R2, but it is to be appreciated that the radius R3 can be larger than one or both of the radii R1, R2 as may be desired.

Further in the example embodiment and as best shown in FIG. 3, the fill passageway portion 334 comprises a source aperture 336 on an outer end 337 of the fill passageway portion 334 opening the fill passageway portion 334 to the first face 22 of the cylindrical body member 20, and a supply aperture 338 on an inner end 339 of the fill passageway portion 334 and in communication with the arc-shaped passageway portion 332 of the arc-shaped groove portion 30. The source aperture 336 is configured to receive the associated tuning weight 40 into the cylindrical body member 20, and the supply aperture 338 is configured to communicate the associated tuning weight 40 between the fill passageway portion 334 and the arc-shaped passageway portion 332 of the arc-shaped groove portion 30. In an example embodiment, the source aperture 336 is configured to receive the fifth and sixth sets 342, 344 of tuning weight bodies of the associated tuning weight 40 into the cylindrical body member 20, and the supply aperture 338 is configured to communicate the fifth and sixth sets 342, 344 of tuning weight bodies of the associated tuning weight 40 between the fill passageway portion 334 and the arc-shaped passageway portion 332 of the arc-shaped groove portion 30.

Also in the example embodiment illustrated, the arc-shaped groove portion 30 defined by the cylindrical body member 20 of the variable inertia flywheel apparatus 10 includes a fourth arc-shaped passageway portion 432 (FIGS. 2-4) and a fourth fill passageway portion 434 (FIG. 3). The fourth arc-shaped and fill passageway portions 432, 434 are defined by the cylindrical body member 20, wherein and as shown, the arc-shaped passageway portion 432 extends circumferentially relative to the longitudinal axis L, and the fill passageway portion 434 extends substantially in parallel with the longitudinal axis L. In the example embodiment the fourth arc-shaped passageway portion 432 extends circumferentially along a circle having a fourth radius R4 relative to the longitudinal axis L. As illustrated, the fourth radius R4 of the arc-shaped passageway portion 432 is the same as the third radius R3 of the arc-shaped passageway portion 332 but it is to be appreciated that the radii R3 and R4 can be different as may be desired. In addition, for embodiments wherein the radii R3 and R4 are the same, the arc-shaped passageway portions 332, 432 may be continuous or equivalently formed as a single arc-shaped passageway portion extending a full 360° circle of revolution about the longitudinal axis L of the cylindrical body member 20. In still further addition, for embodiments wherein the radii R3 and R4 are not the same, the third and fourth arc-shaped passageway portions 332, 432 may be discontinuous or equivalently formed as single separate arc-shaped passageway portions extending up to a full 360° circle of revolution about the longitudinal axis L of the cylindrical body member 20, but spaced apart from the longitudinal axis L by the difference between their respective third and fourth radii R3 and R4. Further in the example embodiment and as best shown in FIG. 3, the fill passageway portion 434 comprises a source aperture 436 on an outer end 437 of the fill passageway portion 434 opening the fill passageway portion 434 to the first face 22 of the cylindrical body member 20, and a supply aperture 438 on an inner end 439 of the fill passageway portion 434 and in communication with the arc-shaped passageway portion 432 of the arc-shaped groove portion 30. The source aperture 436 is configured to receive the associated tuning weight 40 into the cylindrical body member 20, and the supply aperture 438 is configured to communicate the associated tuning weight 40 between the fill passageway portion 434 and the arc-shaped passageway portion 432 of the arc-shaped groove portion 30. In an example embodiment, the source aperture 436 is configured to receive seventh and eighth sets 442, 444 of tuning weight bodies of the associated tuning weight 40 into the cylindrical body member 20, and the supply aperture 438 is configured to communicate the seventh and eighth sets 442, 444 of tuning weight bodies of the associated tuning weight 40 between the fill passageway portion 434 and the arc-shaped passageway portion 432 of the arc-shaped groove portion 30.

Further in accordance with the example embodiment illustrated, the arc-shaped passageway portion 132 of the variable inertia flywheel apparatus 10 defines a closed arc-shaped passageway portion 133 in communication with the fill passageway portion 134. Also, the supply aperture 138 of the variable inertia flywheel apparatus 10 defines a sole pathway of ingress and egress of the associated tuning weight 40 relative to the arc-shaped passageway portion 32. In an example embodiment, the supply aperture 138 of the variable inertia flywheel apparatus 10 defines a sole pathway of ingress and egress of the first and second sets 142, 144 of tuning weight bodies of the associated tuning weight 40 relative to the arc-shaped passageway portion 32.

Similarly and further in accordance with the example embodiment illustrated, the arc-shaped passageway portion 232 of the variable inertia flywheel apparatus 10 defines a closed arc-shaped passageway portion 233 in communication with the fill passageway portion 234. Also, the supply aperture 238 of the variable inertia flywheel apparatus 10 defines a sole pathway of ingress and egress of the associated tuning weight 40 relative to the arc-shaped passageway portion 232. In an example embodiment, the supply aperture 238 of the variable inertia flywheel apparatus 10 defines a sole pathway of ingress and egress of the tuning weight bodies of the associated tuning weight 40 relative to the arc-shaped passageway portion 232.

Similarly and further in accordance with the example embodiment illustrated, the arc-shaped passageway portion 332 of the variable inertia flywheel apparatus 10 defines a closed arc-shaped passageway portion 333 in communication with the fill passageway portion 334. Also, the supply aperture 338 of the variable inertia flywheel apparatus 10 defines a sole pathway of ingress and egress of the associated tuning weight 40 relative to the arc-shaped passageway portion 332. In an example embodiment, the supply aperture 338 of the variable inertia flywheel apparatus 10 defines a sole pathway of ingress and egress of the tuning weight bodies of the associated tuning weight 40 relative to the arc-shaped passageway portion 332.

Similarly and further in accordance with the example embodiment illustrated, the arc-shaped passageway portion 432 of the variable inertia flywheel apparatus 10 defines a closed arc-shaped passageway portion 433 in communication with the fill passageway portion 434. Also, the supply aperture 438 of the variable inertia flywheel apparatus 10 defines a sole pathway of ingress and egress of the associated tuning weight 40 relative to the arc-shaped passageway portion 432. In an example embodiment, the supply aperture 438 of the variable inertia flywheel apparatus 10 defines a sole pathway of ingress and egress of the tuning weight bodies of the associated tuning weight 40 relative to the arc-shaped passageway portion 432.

As shown and as described above, the biasing member 50 of the variable inertia flywheel apparatus 10 is disposed in the arc-shaped passageway portion 32. It is to be appreciated that during use of the variable inertia flywheel apparatus 10 of the example embodiment, a biasing member is provided in the form of a resilient device operable to store energy by being compressed and to then use the stored energy to hold the associated tuning weights in their respective predetermined positions relative to the arc-shaped groove portions. In particular and in an example, the biasing member 50 of the example shown includes a spring device operable to hold first and second sets 142, 144 of tuning weight bodies of the associated tuning weight 40 in predetermined positions at opposite ends of the arc-shaped passageway portion 32. As shown, each of the first and second sets 142, 144 of tuning weight bodies of the associated tuning weight 40 includes seven (7) separate metal balls which and as described above may be metal ball bearings for example. It is to be appreciated, however, that any number of metal balls or the like may be used as necessary and/or desired, and it is further to be appreciated that some of the metal ball bearings may be substituted with tuning weights formed from other materials as may be necessary to achieve a desired inertial characteristic result of the flywheel body member. As an example some of the tuning weight bodies may be metal balls and others of the tuning weight bodies may be hard plastic balls or balls formed of other materials having the necessary temperature and other environmental properties and also having a reduced mass characteristic relative to the metal balls. In this way the tuning weight bodies having the lower mass characteristic may be intermixed with metal ball bearings so that a range of desired inertial characteristic results of the flywheel body member may be obtained. In other example embodiments, some of the tuning weight bodies may be formed of a first type of metal having a first density and others of the tuning weight bodies may be formed of a second type of metal having a second density different than the first density. In still further example embodiments, all of the tuning weight bodies may be formed of a material having the same density, but some of the tuning weight bodies may have different sizes relative to others of the tuning weight bodies.

As described above, the arc-shaped groove portion 30 defined by the cylindrical body member 20 of the variable inertia flywheel apparatus 10 comprises an arc-shaped passageway portion 132 defined by the cylindrical body member 20. In accordance with an example embodiment, the arc-shaped passageway portion 132 defined by the cylindrical body member 20 extends circumferentially relative to the longitudinal axis L on a first side A of a plane P bisecting the cylindrical body member 20 and containing the longitudinal axis L. The plane P extends out of the page in the views presented in FIGS. 2 and 3, and it extends obliquely within the page in the view presented in FIG. 4. The plane P bisects the cylindrical body member 20 along the line PP and the plane P contains the longitudinal axis L, wherein the line PP is perpendicular to the longitudinal axis L. In addition, the cylindrical body member 20 of the variable inertia flywheel apparatus 10 further defines a second arc-shaped passageway portion 232 substantially as shown. The second arc-shaped passageway portion 232 extends circumferentially relative to the longitudinal axis L on a second side B opposite from the first side A of the plane P bisecting the cylindrical body member 20 and containing the longitudinal axis L.

In accordance with an embodiment, the first arc-shaped passageway portion 132 lies entirely on the first side A of the plane P bisecting the cylindrical body member 20 and containing the longitudinal axis L In accordance with an embodiment, the second arc-shaped passageway portion 232 lies entirely on the second side B opposite from the first side A of the plane P bisecting the cylindrical body member 20 and containing the longitudinal axis L In accordance with an embodiment, the first arc-shaped passageway portion 132 lies entirely on the first side A of the plane P and the second arc-shaped passageway portion 232 lies entirely on the second side B opposite from the first side A of the plane P.

In accordance with an embodiment, none of the first arc-shaped passageway portion 132 lies on the second side B opposite from the first side A of the plane P bisecting the cylindrical body member 20 and containing the longitudinal axis L.

In accordance with an embodiment, none of the second arc-shaped passageway portion 232 lies on the first side A opposite from the second side B of the plane P bisecting the cylindrical body member 20 and containing the longitudinal axis L.

In accordance with an embodiment, none of the first arc-shaped passageway portion 132 lies on the second side B of the plane P and none of the second arc-shaped passageway portion 232 lies on the first side A of the plane P.

It is to be appreciated that although in accordance with an embodiment the first arc-shaped passageway portion 132 lies entirely on the first side A of the plane P bisecting the cylindrical body member 20 and containing the longitudinal axis L, in a further embodiment some of the first arc-shaped passageway portion 132 may extend into the second side B opposite from the first side A of the plane P bisecting the cylindrical body member 20 and, further, that one or both of the ends of the first arc-shaped passageway portion 132 may extend into the second side B opposite from the first side A of the plane P bisecting the cylindrical body member 20.

It is also to be appreciated that although in accordance with an embodiment the second arc-shaped passageway portion 232 lies entirely on the second side B of the plane P bisecting the cylindrical body member 20 and containing the longitudinal axis L, in a further embodiment some of the second arc-shaped passageway portion 232 may extend into the first side A opposite from the second side B of the plane P bisecting the cylindrical body member 20 and, further, that one or both of the ends of the second arc-shaped passageway portion 232 may extend into the first side A opposite from the second side B of the plane P bisecting the cylindrical body member 20.

In addition to the above and in accordance with an example embodiment as shown in the drawing Figures such as in particular FIGS. 2 and 3 for example, the first arc-shaped passageway portion 132 is spaced from the longitudinal axis L by a first radius R1, and the second arc-shaped passageway portion 232 is spaced from the longitudinal axis L by a second radius R2. In accordance with the example embodiment, the first and second radii R1, R2 are the same. However, it is to be appreciated that the first and second radii R1, R2 may be different. In accordance with the example embodiment shown, the first and second arc-shaped passageway portions 132, 232 are arranged symmetrically relative to the plane P. In accordance with the example embodiment shown, each of the first and second arc-shaped passageway portions 132, 232 receive the first and second 142, 144 and third and fourth 242, 244 sets, respectively, of tuning weight bodies of the associated tuning weight 40 having the same size into the cylindrical body member 20.

In addition to the above and in accordance with an example embodiment as shown in the drawing Figures such as in particular FIGS. 2 and 3 for example, the third arc-shaped passageway portion 332 is spaced from the longitudinal axis L by a third radius R3, and the fourth arc-shaped passageway portion 432 is spaced from the longitudinal axis L by a fourth radius R4. In accordance with the example embodiment, the third and fourth radii R3, R4 are the same. However, it is to be appreciated that the third and fourth radii R3, R4 may be different. In accordance with the example embodiment shown, the third and fourth arc-shaped passageway portions 332, 432 are arranged symmetrically relative to the plane P. In accordance with the example embodiment shown, each of the third and fourth arc-shaped passageway portions 332, 432 receive the fifth and sixth 342, 344 and seventh and eighth 442, 444 sets, respectively, of tuning weight bodies of the associated tuning weight 40 having the same size into the cylindrical body member 20.

In addition to the above and in accordance with an example embodiment as shown in the drawing Figures such as in particular FIGS. 2 and 3 for example, the first arc-shaped passageway portion 132 is spaced from the longitudinal axis L by a first radius R1, and the third arc-shaped passageway portion 332 is spaced from the longitudinal axis L by a third radius R3. In accordance with the example embodiment, the first and third radii R1, R3 are different. However, it is to be appreciated that the first and third radii R1, R3 may be the same wherein each of the first and third arc-shaped passageway portions 132, 332 would share a portion of the revolution about the longitudinal axis L and spaced from the longitudinal axis by the same radius. In accordance with the example embodiment shown, the first and third arc-shaped passageway portions 132, 332 are arranged to extend into the first side A of the plane P. In accordance with the example embodiment shown, each of the first and third arc-shaped passageway portions 132, 332 receive the first and second 142, 144 and fifth and sixth 342, 344 sets, respectively, of tuning weight bodies of the associated tuning weight 40 having the same size into the cylindrical body member 20.

In addition to the above and in accordance with an example embodiment as shown in the drawing Figures such as in particular FIGS. 2 and 3 for example, the second arc-shaped passageway portion 232 is spaced from the longitudinal axis L by a second radius R2, and the fourth arc-shaped passageway portion 432 is spaced from the longitudinal axis L by a fourth radius R4. In accordance with the example embodiment, the second and fourth radii R2, R4 are different. However, it is to be appreciated that the second and fourth radii R2, R4 may be the same wherein each of the second and fourth arc-shaped passageway portions 232, 432 would share a portion of the revolution about the longitudinal axis L and spaced from the longitudinal axis by the same radius.

In addition to the above and in accordance with an example embodiment as shown in the drawing Figures such as in particular FIGS. 2 and 3 for example, the second arc-shaped passageway portion 232 is spaced from the longitudinal axis L by a second radius R2, and the third arc-shaped passageway portion 332 is spaced from the longitudinal axis L by a third radius R3. In accordance with the example embodiment, the second and third radii R2, R3 are different same. However, it is to be appreciated that the second and third radii R2, R3 may be the same. In accordance with the example embodiment shown, the second and third arc-shaped passageway portions 232, 332 are arranged on opposite sides A, B of the plane P. In accordance with the example embodiment shown, each of the second and third arc-shaped passageway portions 232, 332 receive the third and fourth 242, 244 and fifth and sixth 342, 344 sets, respectively, of tuning weight bodies of the associated tuning weight 40 having the same size into the cylindrical body member 20.

As shown and as described above, biasing members of the variable inertia flywheel apparatus 10 are disposed in the arc-shaped passageway portions. It is to be appreciated that during use of the variable inertia flywheel apparatus 10 of the example embodiment, the biasing members are operable to hold sets of tuning weight bodies 40 in predetermined positions at opposite ends of the arc-shaped passageway portions. As shown in the drawing Figures and in particular as shown in FIG. 4, a first biasing member 150 of the variable inertia flywheel apparatus 10 according to the example embodiment is disposed in the first arc-shaped passageway portion 132 and a second biasing member 250 is disposed in the second arc-shaped passageway portion 232. The first biasing member 150 is operable to hold the first and second sets 142, 144 of tuning weight bodies of the associated tuning weight 40 in respective predetermined positions at opposite ends of the first arc-shaped passageway portion 132. Similarly, the second biasing member 250 is operable to hold third and fourth sets 242, 244 of tuning weight bodies of the associated tuning weight 40 in respective predetermined positions at opposite ends of the second arc-shaped passageway portion 232.

As briefly described above, in the example embodiment illustrated, the arc-shaped groove portion 30 defined by the cylindrical body member 20 of the variable inertia flywheel apparatus 10 includes arc-shaped passageway portions 132, 232 (FIGS. 2-4) and fill passageway portions 134, 234 (FIG. 3). The first fill passageway portion 134 defined by the cylindrical body member 20 extends substantially in parallel with the longitudinal axis L, and comprises first and second apertures 136, 138. A first source aperture 136 is provided on an outer end 137 of the first fill passageway portion 134 opening the first fill passageway portion 134 to the first face 22 of the cylindrical body member 20, and a first supply aperture 138 is provided on an inner end 139 of the first fill passageway portion 134 and is in communication with the first arc-shaped passageway portion 132 of the arc-shaped groove portion 30. The first source aperture 136 is configured to receive first and second sets 142, 144 of tuning weight bodies of the associated tuning weight 40 into the cylindrical body member 20, and first supply aperture 138 is configured to communicate the first and second sets 142, 144 of tuning weight bodies of the associated tuning weight 40 between the first fill passageway portion 134 and the first arc-shaped passageway portion 132. Similarly, the second fill passageway portion 234 defined by the cylindrical body member 20 extends substantially in parallel with the longitudinal axis L, and comprises apertures 236, 238. In this regard, a second source aperture 236 is provided on an outer end 237 of the second fill passageway portion 234 opening the second fill passageway portion 234 to the first face 22 of the cylindrical body member 20, wherein the second source aperture 236 is configured to receive third and fourth sets 242, 244 of tuning weight bodies of the associated tuning weight 40 into the cylindrical body member 20. Also similarly, a second supply aperture 238 is provided on an inner end 239 of the second fill passageway portion 234 and is in communication with the second arc-shaped passageway portion 232 of the arc-shaped groove portion 30. The second supply aperture 238 is configured to communicate the third and fourth sets 242, 244 of tuning weight bodies of the associated tuning weight 40 between the second fill passageway portion 234 and the second arc-shaped passageway portion 232.

As described above, the cylindrical body member 20 of the variable inertia flywheel apparatus 10 according to the example embodiment defines one or more arc-shaped groove portions 30. In the example shown, four (4) arc-shaped groove portions 132, 232, 332, 432 are provided. In this regard, the first arc-shaped passageway portion 132 defined by the cylindrical body member 20 extends circumferentially relative to the longitudinal axis L on a first side A of a plane P bisecting the cylindrical body member 20 and containing the longitudinal axis L. The first arc-shaped passageway portion 132 is configured to receive a first tuning weight body 140 of the associated tuning weight 40, wherein the first tuning weight body 140 in the example embodiment includes the first and second sets 142, 144 of tuning weight bodies of the associated tuning weight 40. Similarly, the third arc-shaped passageway portion 332 defined by the cylindrical body member 20 extends circumferentially relative to the longitudinal axis L on the first side A of the plane P bisecting the cylindrical body member 20 and containing the longitudinal axis L. The third arc-shaped passageway portion 332 is configured to receive a third tuning weight body 340 of the associated tuning weight 40, wherein the third tuning weight body 340 in the example embodiment includes the fifth and sixth sets 342, 344 of tuning weight bodies of the associated tuning weight 40. Also similarly, the second arc-shaped passageway portion 232 defined by the cylindrical body member 20 extends circumferentially relative to the longitudinal axis L on a second side B opposite from the first side A of the plane P bisecting the cylindrical body member 20 and containing the longitudinal axis L. The second arc-shaped passageway portion 232 is configured to receive a second tuning weight body 240 of the associated tuning weight 40, wherein the second tuning weight body 240 in the example embodiment includes the third and fourth sets 242, 244 of tuning weight bodies of the associated tuning weight 40. Still further similarly, the fourth arc-shaped passageway portion 432 defined by the cylindrical body member 20 extends circumferentially relative to the longitudinal axis L on the second side B of the plane P bisecting the cylindrical body member 20 and containing the longitudinal axis L. The fourth arc-shaped passageway portion 432 is configured to receive a fourth tuning weight body 440 of the associated tuning weight 40, wherein the fourth tuning weight body 440 in the example embodiment includes the seventh and eighth sets 442, 444 of tuning weight bodies of the associated tuning weight 40.

In accordance with an embodiment, the third arc-shaped passageway portion 332 lies entirely on the first side A of the plane P bisecting the cylindrical body member 20 and containing the longitudinal axis L.

In accordance with an embodiment, the fourth arc-shaped passageway portion 432 lies entirely on the second side B opposite from the first side A of the plane P bisecting the cylindrical body member 20 and containing the longitudinal axis L.

In accordance with an embodiment, the third arc-shaped passageway portion 332 lies entirely on the first side A of the plane P and the fourth arc-shaped passageway portion 432 lies entirely on the second side B opposite from the first side A of the plane P.

In accordance with an embodiment, none of the third arc-shaped passageway portion 332 lies on the second side B opposite from the first side A of the plane P bisecting the cylindrical body member 20 and containing the longitudinal axis L.

In accordance with an embodiment, none of the fourth arc-shaped passageway portion 432 lies on the first side A opposite from the second side B of the plane P bisecting the cylindrical body member 20 and containing the longitudinal axis L.

In accordance with an embodiment, none of the third arc-shaped passageway portion 332 lies on the second side B of the plane P and none of the fourth arc-shaped passageway portion 432 lies on the first side A of the plane P.

It is to be appreciated that although the first and third arc-shaped passageway portions 132, 332 lie entirely on the first side A of the plane P bisecting the cylindrical body member 20 and containing the longitudinal axis L, in a further embodiment some of the first arc-shaped passageway portion 132 may extend into the second side B opposite from the first side A of the plane P bisecting the cylindrical body member 20 and, further, that one or both of the ends of the first arc-shaped passageway portion 132 may extend into the second side B opposite from the first side A of the plane P bisecting the cylindrical body member 20, and further that some of the third arc-shaped passageway portion 332 may extend into the second side B opposite from the first side A of the plane P bisecting the cylindrical body member 20 and, further, that one or both of the ends of the third arc-shaped passageway portion 332 may extend into the second side B opposite from the first side A of the plane P bisecting the cylindrical body member 20.

It is still yet further also to be appreciated that although the second and fourth arc-shaped passageway portions 232, 432 lie entirely on the second side B of the plane P bisecting the cylindrical body member 20 and containing the longitudinal axis L, in a further embodiment some of the second arc-shaped passageway portion 232 may extend into the first side A opposite from the second side B of the plane P bisecting the cylindrical body member 20 and, further, that one or both of the ends of the second arc-shaped passageway portion 232 may extend into the first side A opposite from the second side B of the plane P bisecting the cylindrical body member 20, and further that some of the fourth arc-shaped passageway portion 432 may extend into the second side B opposite from the first side A of the plane P bisecting the cylindrical body member 20 and, further, that one or both of the ends of the fourth arc-shaped passageway portion 432 may extend into the second side B opposite from the first side A of the plane P bisecting the cylindrical body member 20.

In the example embodiments the one or more arc-shaped groove portions 30 defined by the cylindrical body member 20 of the variable inertia flywheel apparatus 10 may be spaced apart from the longitudinal axis L by one or more selected radii as may be necessary and/or desired to effect, in combination with a selection of the masses of the associated tuning weights 40 disposed within the arc-shaped groove portions 30 a desired inertial characteristic result of the flywheel body member. In this regard and with continued reference to FIGS. 2-4, the first arc-shaped passageway portion 132 is spaced from the longitudinal axis L by the first radius R1, the second arc-shaped passageway portion 332 is spaced from the longitudinal axis L by the second radius R2, the third arc-shaped passageway portion 332 is spaced from the longitudinal axis L by the third radius R3, and the fourth arc-shaped passageway portion 432 is spaced from the longitudinal axis L by the fourth radius R4.

In the example embodiment, the first and second radii R1, R2 are the same and, accordingly, a mass placed in either of the first or second arc-shaped passageway portions 132, 232 would have the same inertial effect for tuning the flywheel apparatus of the variable inertia flywheel system 1 of the example embodiments. Similarly in the example embodiment, the third and fourth radii R3, R4 are the same and, accordingly, a mass placed in either of the third or fourth arc-shaped passageway portions 332, 432 would have the same inertial effect for tuning the flywheel apparatus of the variable inertia flywheel system 1 of the example embodiments. However, the first arc-shaped passageway portion 132 may be spaced from the longitudinal axis L by a first radius R1 that is different than (greater than or less than) the second radius R2 of the spacing between the second arc-shaped passageway portion 232 and the longitudinal axis L. In this example embodiment the tuning weight bodies of the associated tuning weights 40 placed in the first and second arc-shaped passageway portions 132, 232 would be adjusted to be provided having different inertial masses so that the combined inertial effects of the weights and the spacings still provide a balance on opposite sides of the plane A. In addition, the third arc-shaped passageway portion 332 may be spaced from the longitudinal axis L by a third radius R3 that is different than (greater than or less than) the fourth radius R4 of the spacing between the fourth arc-shaped passageway portion 432 and the longitudinal axis L. In this example embodiment the tuning weight bodies of the associated tuning weights 40 placed in the third and fourth arc-shaped passageway portions 332, 432 would be adjusted to be provided having different inertial masses so that the combined inertial effects of the weights and the spacings still provide a balance on opposite sides of the plane A.

As described above and as shown in the drawing Figures and in particular as shown in FIG. 4, a first biasing member 150 of the variable inertia flywheel apparatus 10 according to the example embodiment is disposed in the first arc-shaped passageway portion 132 and a second biasing member 250 is disposed in the second arc-shaped passageway portion 232. The first biasing member 150 is operable to hold the first and second sets 142, 144 of tuning weight bodies of the associated tuning weight 40 in respective predetermined positions at opposite ends of the first arc-shaped passageway portion 132. Similarly, the second biasing member 250 is operable to hold third and fourth sets 242, 244 of tuning weight bodies of the associated tuning weight 40 in respective predetermined positions at opposite ends of the second arc-shaped passageway portion 232. In further addition, a third biasing member 350 of the variable inertia flywheel apparatus 10 according to the example embodiment is disposed in the third arc-shaped passageway portion 332 and a fourth biasing member 440 is disposed in the fourth arc-shaped passageway portion 432. The third biasing member 350 is operable to hold fifth and sixth sets 342, 344 of tuning weight bodies of the associated tuning weight 40 in respective predetermined positions at opposite ends of the third arc-shaped passageway portion 332. Similarly, the fourth biasing member 450 is operable to hold seventh and eighth sets 442, 444 of tuning weight bodies of the associated tuning weight 40 in respective predetermined positions at opposite ends of the fourth arc-shaped passageway portion 432.

It is to be understood that in practice, the spherical objects that are preferably tightly received in the one or more arc-shaped groove portions so that they do not move, rattle, or otherwise dislocate from their intended position(s) within the groove portions during use of the flywheel system 1. The spherical objects may be cooled to very low temperature such as my immersing them in liquid nitrogen for example so that they may reduce in size by shrinking before insertion into the groove portions, then allowed to expand in situ after they are properly located to their respective desired position (s) within the groove portions such as by holding them in place by the one or more biasing members 150, 250, 350, 450 described above, for example.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A variable inertia flywheel apparatus comprising:
    a cylindrical body member defining:
        a longitudinal axis L extending between spaced apart front and rear faces of the cylindrical body member; and
        an arc-shaped groove portion extending circumferentially relative to the longitudinal axis L, wherein the arc-shaped groove portion defined by the cylindrical body member is configured to selectively receive an associated tuning weight having a mass sufficient to vary an inertial property of the cylindrical body member between:
            a first inertial property with the associated tuning weight selectively removed from the arc-shaped groove portion; and
            a second inertial property greater than the first inertial property with the associated tuning weight selectively received in the arc-shaped groove portion; and
    a biasing member disposed in the arc-shaped groove portion, the biasing member being operable to hold the associated tuning weight in a predetermined immovable position relative to the body member during use of the flywheel apparatus.

2. The variable inertia flywheel apparatus according to claim 1, wherein:
    the biasing member comprises a spring device operable to hold first and second sets of tuning weight bodies of the associated tuning weight in respective predetermined positions at opposite ends of the arc-shaped groove portion.

3. The variable inertia flywheel apparatus according to claim 1, wherein the arc-shaped groove portion defined by the cylindrical body member comprises:
    an arc-shaped passageway portion defined by the cylindrical body member and extending circumferentially relative to the longitudinal axis L; and
    a fill passageway portion defined by the cylindrical body member and extending substantially in parallel with the longitudinal axis L, wherein the fill passageway portion comprises:
        a source aperture on an outer end of the fill passageway portion opening the fill passageway portion to the first face of the cylindrical body member, the source aperture being configured to receive the associated tuning weight into the cylindrical body member; and
        a supply aperture on an inner end of the fill passageway portion and in communication with the arc-shaped passageway portion of the arc-shaped groove portion, the supply aperture being configured to communicate the associated tuning weight between the fill passageway portion and the arc-shaped passageway portion of the arc-shaped groove portion.

4. The variable inertia flywheel apparatus according to claim 3, wherein:
    the arc-shaped passageway portion comprises a closed arc-shaped passageway portion in communication with the fill passageway portion; and
    the supply aperture defines a sole pathway of ingress and egress of the associated tuning weight relative to the arc-shaped passageway portion.

5. The variable inertia flywheel apparatus according to claim 3, wherein:
    the biasing member comprises a spring device, a resilient compressible member, or a screw jack operable to hold first and second sets of tuning weight bodies of the associated tuning weight in predetermined immovable positions relative to the body member at opposite ends of the arc-shaped passageway portion.

6. The variable inertia flywheel apparatus according to claim 1, wherein the arc-shaped groove portion defined by the cylindrical body member comprises:
    a first arc-shaped passageway portion defined by the cylindrical body member and extending circumferentially relative to the longitudinal axis L on a first side A of a plane P bisecting the cylindrical body member and containing the longitudinal axis L; and a second arc-shaped passageway portion defined by the cylindrical body member and extending circumferentially relative to the longitudinal axis L on a second side B opposite from the first side A of the plane P bisecting the cylindrical body member and containing the longitudinal axis L.

7. The variable inertia flywheel apparatus according to claim 6, wherein:

the first arc-shaped passageway portion is spaced from the longitudinal axis L by a first radius R1; and the second arc-shaped passageway portion is spaced from the longitudinal axis L by a second radius R2, wherein the first and second radii R1, R2 are the same.

8. The variable inertia flywheel apparatus according to claim 6, wherein:

the first arc-shaped passageway portion is spaced from the longitudinal axis L by a first radius R1; and the second arc-shaped passageway portion is spaced from the longitudinal axis L by a second radius R4, wherein the first and second radii R1, R4 are the different.

9. The variable inertia flywheel apparatus according to claim 6, wherein the biasing member comprises:

a first biasing member disposed in the first arc-shaped passageway portion, the first biasing member being operable to hold first and second sets of tuning weight bodies of the associated tuning weight in respective immovable predetermined positions relative to the body member at opposite ends of the first arc-shaped passageway portion; and a second biasing member disposed in the second arc-shaped passageway portion, the second biasing member being operable to hold third and fourth sets of tuning weight bodies of the associated tuning weight in respective immovable predetermined positions relative to the body member at opposite ends of the second arc-shaped passageway portion.

10. The variable inertia flywheel apparatus according to claim 6, wherein the arc-shaped groove portion defined by the cylindrical body member comprises:

a first fill passageway portion defined by the cylindrical body member and extending substantially in parallel with the longitudinal axis L, wherein the first fill passageway portion comprises:

a first source aperture on an outer end of the first fill passageway portion opening the first fill passageway portion to the first face of the cylindrical body member, the first source aperture being configured to receive first and second sets of tuning weight bodies of the associated tuning weight into the cylindrical body member; and a first supply aperture on an inner end of the first fill passageway portion and in communication with the first arc-shaped passageway portion of the arc-shaped groove portion, the first supply aperture being configured to communicate the first and second sets of tuning weight bodies of the associated tuning weight between the first fill passageway portion and the first arc-shaped passageway portion; and a second fill passageway portion defined by the cylindrical body member and extending substantially in parallel with the longitudinal axis L, wherein the second fill passageway portion comprises:

a second source aperture on an outer end of the second fill passageway portion opening the second fill passageway portion to the first face of the cylindrical body member, the second source aperture being configured to receive third and fourth sets of tuning weight bodies of the associated tuning weight into the cylindrical body member; and a second supply aperture on an inner end of the second fill passageway portion and in communication with the second arc-shaped passageway portion of the arc-shaped groove portion, the second supply aperture being configured to communicate the third and fourth sets of tuning weight bodies of the associated tuning weight between the second fill passageway portion and the second arc-shaped passageway portion.

11. The variable inertia flywheel apparatus according to claim 1, wherein the arc-shaped groove portion defined by the cylindrical body member comprises:

a first arc-shaped passageway portion defined by the cylindrical body member and extending circumferentially relative to the longitudinal axis L on a first side A of a plane P bisecting the cylindrical body member and containing the longitudinal axis L, wherein the first arc-shaped passageway portion is configured to receive first and second sets of tuning weight bodies of the associated tuning weight; and a second arc-shaped passageway portion defined by the cylindrical body member and extending circumferentially relative to the longitudinal axis L on the first side A of the plane P bisecting the cylindrical body member and containing the longitudinal axis L, wherein the second arc-shaped passageway portion is configured to receive third and fourth sets of tuning weight bodies of the associated tuning weight.

12. The variable inertia flywheel apparatus according to claim 11, wherein:

the first arc-shaped passageway portion is spaced from the longitudinal axis L by a first radius R1; and the second arc-shaped passageway portion is spaced from the longitudinal axis L by a second radius R3 less than the first radius R1.

13. The variable inertia flywheel apparatus according to claim 11, wherein:

the first arc-shaped passageway portion is spaced from the longitudinal axis L by a first radius R1; and the second arc-shaped passageway portion is spaced from the longitudinal axis L by the first radius R3.

14. The variable inertia flywheel apparatus according to claim 11, further comprising:

a first biasing member disposed in the first arc-shaped passageway portion, the first biasing member being operable to hold the first and second sets of tuning weight bodies of the associated tuning weight in predetermined positions at opposite ends of the first arc-shaped passageway portion; and a second biasing member disposed in the second arc-shaped passageway portion, the second biasing member being operable to hold the third and fourth sets of tuning weight bodies of the associated tuning weight in predetermined positions at opposite ends of the second arc-shaped passageway portion.

15. The variable inertia flywheel apparatus according to claim 11, wherein the arc-shaped groove portion defined by the cylindrical body member comprises:

a third arc-shaped passageway portion defined by the cylindrical body member and extending circumferentially relative to the longitudinal axis L on a second side B opposite from the first side A of the plane P bisecting the cylindrical body member and containing the longitudinal axis L, wherein the third arc-shaped passageway portion is configured to receive a third tuning weight body of the associated tuning weight; and a fourth arc-shaped passageway portion defined by the cylindrical body member and extending circumferentially relative to the longitudinal axis L on the second side B of the plane P bisecting the cylindrical body member and containing the longitudinal axis L, wherein the fourth arc-shaped passageway portion is configured to receive a fourth tuning weight body of the associated tuning weight.

16. The variable inertia flywheel apparatus according to claim 15, wherein:
the first arc-shaped passageway portion is spaced from the longitudinal axis L by a first radius R1;
the second arc-shaped passageway portion is spaced from the longitudinal axis L by a second radius R3 less than the first radius R1,
the third arc-shaped passageway portion is spaced from the longitudinal axis L by a third radius R2; and
the fourth arc-shaped passageway portion is spaced from the longitudinal axis L by a fourth radius R4 less than the third radius R2.

17. The variable inertia flywheel apparatus according to claim 15, wherein:
the first radius R1 of the first arc-shaped passageway portion and the third radius R2 of the third arc-shaped passageway portion are the same; and
the second radius R3 of the second arc-shaped passageway portion and the fourth radius R4 of the fourth arc-shaped passageway portion are the same.

18. The variable inertia flywheel apparatus according to claim 1, wherein:
the second inertial property of the cylindrical body member with the associated tuning weight received in the arc-shaped groove portion remains unchanged or otherwise fixed for any position of the associated tuning weight along the arc-shaped groove portion of the cylindrical body member.

19. The variable inertia flywheel apparatus according to claim 1, wherein:
the biasing member comprises a spring device, a resilient compressible member, or a screw jack operable to hold first and second sets of tuning weight bodies of the associated tuning weight in respective predetermined immovable positions relative to the body member in positions at opposite ends of the arc-shaped groove portion.

20. A variable inertia flywheel system comprising:
one or more tuning weights; and
a variable inertia flywheel apparatus comprising:
a cylindrical body member defining:
a longitudinal axis L extending between spaced apart front and rear faces of the cylindrical body member; and
an arc-shaped groove portion extending circumferentially relative to the longitudinal axis L, wherein the arc-shaped groove portion defined by the cylindrical body member is configured to selectively receive the one or more tuning weights to vary an inertial property of the cylindrical body member between:
a first inertial property with the one or more tuning weights selectively removed from the arc-shaped groove portion; and
a second inertial property greater than the first inertial property with the one or more tuning weights selectively received in the arc-shaped groove portion and held in the arc-shaped groove portion immovably relative to the body member during use of the flywheel system.

21. The variable inertia flywheel system according to claim 20, further comprising:
a biasing member operable to hold the one or more tuning weights in the arc-shaped groove portion immovably relative to the body member during the use of the flywheel system.

* * * * *